US005529696A

United States Patent [19]

Tibbitts

[11] Patent Number: 5,529,696

[45] Date of Patent: Jun. 25, 1996

[54] METHOD OF LAUNDERING ITEMS AND PURIFYING WASTE WATER THEREFROM

[75] Inventor: Dave Tibbitts, Mason, Ohio

[73] Assignee: Diversey Corporation, Mississauga, Canada

[21] Appl. No.: 504,777

[22] Filed: Jul. 20, 1995

[51] Int. Cl.[6] .................................................. B01D 17/05

[52] U.S. Cl. .......................... 210/705; 210/708; 210/724; 210/735; 210/736; 210/730; 34/359; 34/519

[58] Field of Search .................................... 210/724, 708, 210/705, 734, 735, 736, 730; 34/6, 10, 25.1, 34, 40

[56] References Cited

U.S. PATENT DOCUMENTS

| | | |
|---|---|---|
| 3,609,088 | 9/1971 | Sumner . |
| 3,625,902 | 12/1971 | Sumner . |
| 3,865,754 | 2/1975 | Norris et al. . |
| 3,956,117 | 5/1976 | Bradley et al. . |
| 4,059,515 | 11/1977 | Fowler et al. . |
| 4,083,793 | 4/1978 | Jakobi et al. . |
| 4,248,729 | 2/1981 | Rubingh et al. . |
| 4,264,465 | 4/1981 | Abel . |
| 4,826,618 | 5/1989 | Borseth et al. . |

FOREIGN PATENT DOCUMENTS

| | | |
|---|---|---|
| 1489694 | 1/1975 | United Kingdom . |
| 2005715 | 10/1978 | United Kingdom . |

*Primary Examiner*—Neil McCarthy
*Attorney, Agent, or Firm*—Wood, Herron & Evans

[57] ABSTRACT

A method of laundering oily items comprises laundering said items in a wash solution which includes a surfactant system and a source of alkalinity. The source of alkalinity is an alkali metal aluminate preferably sodium aluminate at a concentration effective to have at least about 25 ppm of the alkali aluminate present in the wash solution measured as alumina. The wash solution is then separated from the laundered items and its pH reduced to about 9 or less. A destabilizing polymer such as diallyldimethyl ammonium chloride can be added. This combination causes the oil and grease to separate from the wash solution and float to the surface along with the sodium aluminate. If the concentration of the sodium aluminate is above about 100 ppm preferably about 250 ppm, there is no need to add the destabilizing polymer. This does not affect the overall efficiency of the detergent, yet significantly improves the ability to separate the oil and grease from the waste wash solution.

13 Claims, 5 Drawing Sheets

METHOD OF LAUNDERING ITEMS AND PURIFYING WASTE WATER THEREFROM

BACKGROUND OF THE INVENTION

Commercial laundries process a variety of different items including rental garments, floor mats, print or ink towels, and shop towels. Many applications produce a large amount of oil or other hydrocarbon waste product, particularly laundering shop towels. The purpose of the detergent composition is to remove this oil along with other dirt and soil from the items being laundered. This is accomplished by using a combination of surfactants, alkaline agents, as well as antiredeposition agents and various sequestrants to achieve maximum cleaning efficacy. The surfactants in particular function to keep the oily soils emulsified and suspended in the wash water. In general, the more stable the emulsion generated in the wash water, the better the cleaning performance of the detergent system.

At the same time, it is frequently necessary to remove this oily soil from the wash waste water prior to disposing of this waste water to the sewer. Thus, it is necessary to counteract the effect of the wash solution in order to separate the oil from the emulsified wash solution before disposing the wash water. However, the more stable the emulsion generated in the wash water, the more difficult and costly separation becomes.

There have been many attempts to accomplish this. For example, amphoteric surfactants have been used. At an alkaline pH these are effective surfactants for emulsifying oil, but at an acid pH, their ability to function as a surfactant is reduced. This effectively enables one to lower the oil and grease content of the waste water to several hundred ppm. But this is not adequate to meet most current standards. This application also increases the potential of solubilizing heavy metal contaminants in the acidic pH required to destabilize the emulsion.

Many laundries treat the wash solution subsequent to the wash process in order to remove emulsified oil and grease. This requires the addition of various water treatment chemicals and the use of expensive water treatment systems in order to counteract the effects of the surfactants. Even with the chemical treatment one must design the wash solution to optimize water purification using whatever post treatment is available.

Many companies have changed surfactant systems resorting to less water soluble surfactants, or have actually lowered the amount of the surfactants in order to minimize emulsion stability. The net overall effect of these actions is the reduction of cleaning efficacy of the detergent.

SUMMARY OF THE INVENTION

It is an object of the present invention to provide a method of laundering oily items in a commercial laundry and subsequently treating the waste water to remove most of the oil in the waste wash solution. It is further an object of the present invention to accomplish this without reducing the efficacy of the detergent composition.

These objectives are achieved by laundering the items in a wash solution which includes an effective amount of sodium aluminate measured as alumina in combination with one or more laundry detergent components including surfactants, antiredeposition agents and sequestrants. The aluminate is a source of alkalinity in the wash solution. Preferably, the aluminate is added in sufficient quantity to establish the pH of the wash solution above 9. The wash solution after use is then collected and its pH reduced to below 9 whereby the colloids of the emulsion become entrapped as the $Al(OH)_3$ precipitant forms causing the oily soils to separate from the solution.

The separation can be facilitated with the addition of common organic polyelectrolytes, such as polydimethyldiallyl ammonium chloride. If the concentration of aluminate is increased to above 75 ppm up to 4,000 ppm or more, the need for these polymers can be reduced or eliminated. According to the present invention, sodium aluminate can act both as an alkalinity source, as well as a coagulant for the treatment of the waste laundry solution.

The objects and advantages of the present invention will be further appreciated in light of the following detailed description and drawing in which:

DETAILED DESCRIPTION

Figure 1:
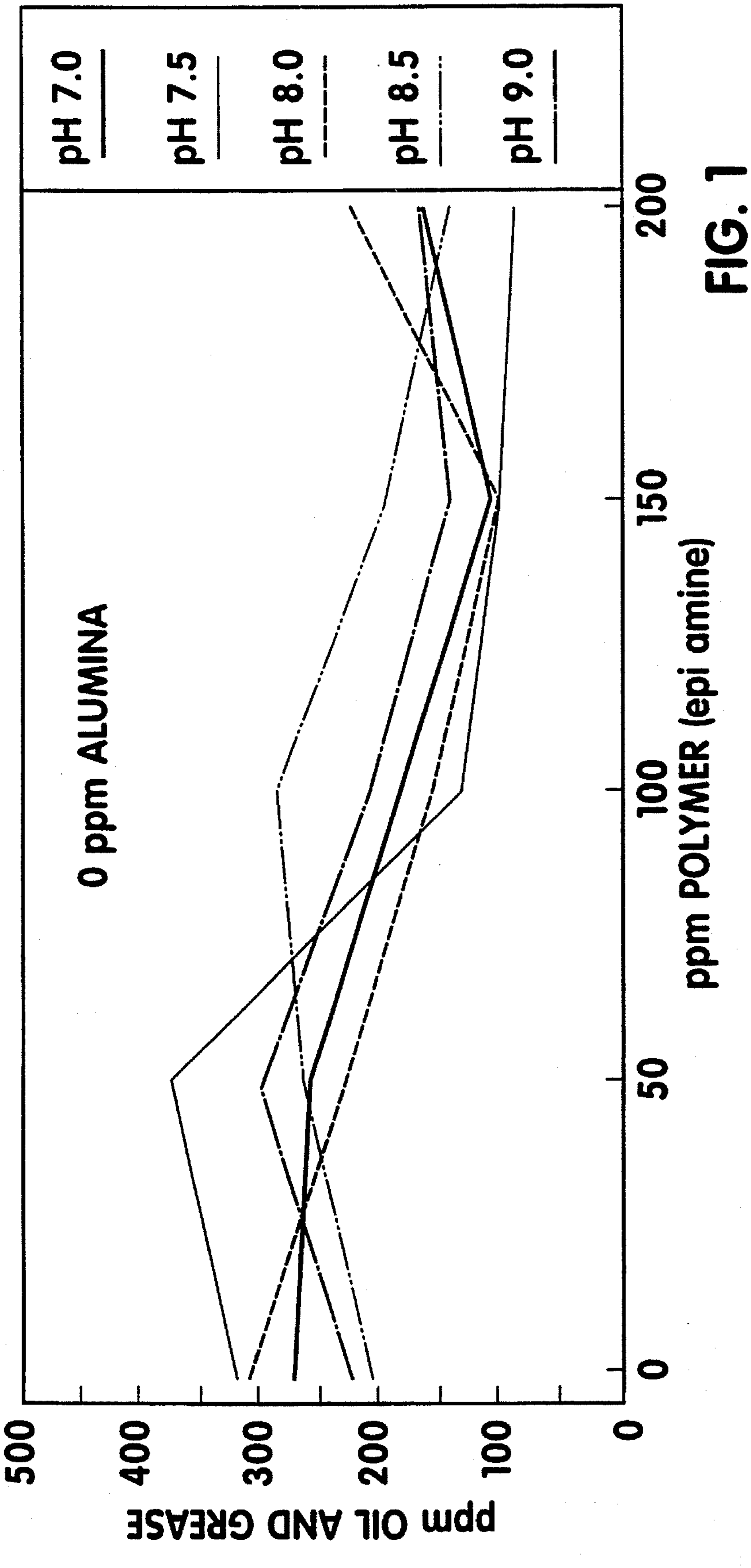
FIGS. 1–5 are graphic representations of oil separation under varying concentration of alumina, pH and polymer concentrations.

According to the present invention items are laundered in a alkaline laundry detergent solution. Subsequently, the pH of the waste wash solution is lowered causing the oily soils contained within the wash solution in the form of an emulsion to separate from the wash solution.

The laundry solution is a combination of alkaline metal aluminate, a surfactant system and optionally antiredeposition agents and sequestrants. The concentration of these components prior to introduction may vary widely and is largely a function of formulation and dispensing. In this description all percentages are percentages by weight in the wash water unless otherwise indicated. Likewise concentration in ppm refers to the wash water unless otherwise specified.

The surfactant system used in the present invention can include anionic surfactants, nonionic surfactants, amphoteric surfactants or combinations of these surfactants.

Typically the nonionics that will be used will include the alkaline oxide adducts of polyhydric components, alkylaryl ethoxylates, alcohol ethoxylates and mixtures thereof. Among the useful nonionic surfactants typifying the alkaline oxide adducts of polyhydric components are the ethylene oxide adducts of ethylenediamine sold commercially under the name Tetronic, as well as the ethylene oxide propylene oxide adducts of propylene glycol sold commercially under the name Pluronic.

Representative of the alkylaryl ethoxylates are for example the polyethylene oxide condensates of alkylphenols. The alkyl substitutient in such compounds may be derived from polymerized propylene, diisobutylene, octene or nonene. Examples of compounds of this type include nonylphenol condensed with about two to about nine moles of ethyleneoxide per mole of nonylphenol. Commercially available nonionic surfactants of this type include Tergitol NP-9 sold by Union Carbide.

The alcohol ethoxylates useful herein include the condensation products of aliphatic alcohols with ethylene oxide. The alkyl chain of the aliphatic alcohol may either be straight or branched and generally contains 8 to 22 carbon atoms. Examples of commercially available nonionic surfactants of this type include Tergitol 15-S-3, 15-S-5; Tergitol 25-L-3 and 25-L-5 marketed by Union Carbide Corporation.

Generally in the present invention the nonionic surfactants will be used at a concentration of about 0.01% to about 1% by weight of the wash detergent solution. This can be varied widely depending upon the nature of the item being washed, its soil conditions, and the like.

In addition to the nonionic surfactants useful in the present invention, anionic surfactants may also be employed. Among the useful anionic detergent compounds are the water soluble salts and particularly the alkali metal salts, of organic sulfuric acid reaction products, such as the sulfonates and sulfates of alkyl and alkylaryl moieties containing 8 to 22 carbon atoms in the alkyl portion of the radical. Commercially important are the linear alkyl sulfonate sodium salts, such as sodium lauryl sulfonate and sodium and potassium alkylbenzene sulfonate. Anionic surfactants can be used in amounts ranging from 0 to about 0.5% preferably 0.001% to 0.02% in the wash solution.

Amphoteric surfactants can also be employed herein and are generally based on the alkyl imidazolines such as the Monaterics sold by Mona. Other amphoterics include the quaternary ammonium carboxylates and the quaternary ammonium sulfates. Amphoteric surfactants can be used in amounts ranging from 0 to about 1%.

Cationic surfactants may also be used in the present invention but are generally less effective cleaning agents and therefore generally not employed in commercial laundry detergents.

In addition to the surfactants, the laundry wash solution would generally include a sequestrant for hardness ions. Such sequestrants include salts of nitrilotriacetic acid, ethylenediaminetetraacetic acid, zeolites in powder form and sodium citrate and sodium carbonate. Phosphates are typically employed as sequestrants but these would react with the sodium aluminate to form insoluble aluminum phosphate compounds and therefore should not be employed in any significant amount in the present invention and preferably are not included whatsoever. Generally 0 to 0.5% of the wash will be sequestrant depending on the sequestrant employed and the hardness of the wash water.

In addition to the surfactant system, the wash solution may include antiredeposition aids, such as water soluble polymers of polyacrylic acid and polymethylacrylic acid and carboxymethylcellulose. Generally the acrylates will have a molecular weight of 1,000 to about 10,000 with 4,500 being preferred. The concentration of these in the wash solution should be from about 0.001 to about 0.1% with 0.04% being preferred.

The alkali metal aluminate can be any alkali metal aluminate, including sodium aluminate, potassium aluminate, and lithium aluminate. Preferably the aluminate will be either sodium aluminate or potassium aluminate with sodium aluminate being preferred because of its higher level of alkalinity.

The amount of aluminate added to the system will vary depending upon the items being washed. The aluminate is preferably the sole or primary source of alkalinity in the wash solution. The concentration of the aluminate as measured in ppm of alumina, should be at least about 25 ppm. This can be increased significantly up to about 2,500 to 4,000 ppm or more in the wash water if a highly alkaline wash solution is desired. This would be particularly useful for cotton shop towels. More preferably, the concentration of sodium aluminate would be in the range of about 275 ppm to 1,100 ppm. The greater the amount of aluminate present, the easier it is to split from the wash solution during purification of the waste water. At the lower concentrations below about 100 ppm, a coagulating polymer may be required. Whereas, at the higher concentrations, particularly above 250 ppm, the need for this polymer is significantly reduced.

Sodium aluminate can be purchased in a variety of different forms and molar ratios of sodium oxide/aluminum oxide. Generally the mole ratio of the alkaline metal oxide to aluminum oxide will be in the range of 1/1 to about 10/1 on a molar basis. The sodium aluminate can be added to the wash solution either as a solid or as a liquid. Two particular brands of liquid sodium aluminate are sold by Vinings Industries. The first is VSA45 which is a 45% solid solution of sodium aluminate. This has a $Na_2O$-$Al_2O_3$ ratio of 1.26/1 on a molar basis which is 25.5% $Al_2O_3$ and 19.5% $Na_2O$. The product becomes rather viscous at lower temperatures. The viscosity of this product is greater than 2,000 centipoise at 60° F. and greater than 10,000 centipoise at 25° F. Therefore a second product VSA 38 also sold by Vinings which is a 38% solids solution having a mole ratio of 1.5/1 $Na_2O/Al_2O_3$ which is 18.3% $Na_2O$ and 19.9% $Al_2O_3$ is preferred. It remains much less viscous at lower temperatures, less than 200 cps at 60° F. and less than 900 at 25° F. Obviously, if one were adding sodium aluminate as a solid this would not be a significant concern.

In one preferred embodiment the sodium aluminate would be added to the wash solution as one component, i.e., the alkaline builder with a surfactant system added separately to the wash solution as a second component. The surfactant system can include the nonionic surfactants, antireclepositition aid and a nonphosphate sequestrant. The alkaline builder would be an aqueous solution containing 10–100% sodium aluminate solution (having a solid content of 45% or less, preferably 38%) in combination with 0 to 5% antiredeposition aid and 0 to 10% sequestrant and water (by weight based on the total weight of the alkaline builder).

The surfactant system can be any concentrated combination of surfactants, sequestrants and antiredeposition aids in solid or liquid form. Examples of formulations are disclosed in U.S. Pat. No. 4,826,618 the disclosure of which is incorporated herein by reference.

The washing conditions are dependent upon the individual launders' equipment, but generally is conducted at a temperature of 120° F. to about 180° F. for a period of about 10–20 minutes. Afterwards the dirty wash solution referred to as the break, which now includes the dirt and oil collected from the laundered items, is separated from the laundered items and subjected to filtration if desired to remove suspended solids. The laundry itself is subjected to repeated rinses with fresh water and treated with a laundry sour if desired.

The pH of the waste wash solution or break is then adjusted to 9 or less by the addition of water which can be for example from the carryover or rinse water, or alternately the pH can be adjusted by adding an acidic solution such as sulfuric acid or both dilution and pH adjustment. As the pH of the wash solution is reduced below 9, the aluminate ion, $Al(OH)_4^-$ or $AlO_2^-$ converts from the soluble to the insoluble hydrous oxide $Al(OH)_3$ form. As the precipitate forms, the colloidal particles which include surfactant from detergent and oil and grease which were removed from laundry are enmeshed in the hydrous oxide floc which is formed, called "sweep floc."

If the concentration of the sodium aluminate is less than 100 ppm $Al_2O_3$, it will generally be necessary to add a coagulating polymer in order to bridge microfloc which has formed with the aluminate treatment. Typically used coagulating polymers (which are generally polyelectrolytes) include polydiallyldimethyl ammonium chloride (DDAC) and epichlorohydrin dimethylamine (EpiAmine). Other well known coagulating polymers can be employed. Generally, 25 ppm to about 125 ppm of this polymer would be added depending on the soil and oil in the waste water. In addition, 1 to about 10 ppm and preferably 7.5–10 ppm of a flocculent such as water soluble polyacrylamides can be employed. Other flocculents are well known and the selection of the particular flocculent is not significant. If the concentration of the alumina in the waste water is greater than 100 ppm, less or no coagulant is required. However, the flocculent may still be preferred.

Once the oil and surfactant separate from the waste water, it is collected by skimming or other well known techniques and the waste water is discharged generally into the sanitary sewer system.

In a less preferred embodiment of the present invention the sodium aluminate can be added to the waste water after the items have been laundered and the waste water separated from the laundered items. This is less preferred because it would require a separate source of alkalinity for the laundered items, and further this would make it more difficult to reduce the pH to less than 9 since the sodium aluminate is alkaline. This can effect the same result, but at a significantly higher cost and therefore is less preferred.

The present invention will be further appreciated in light of the following detailed examples. In these examples two different types of industrial items were tested, color 65/35, polyester cotton, industrial pants listed as pants, and red industrial, 100% cotton shop towels listed as shop towels. In these tests the detergent is a commercially available emulsified nonionic detergent which includes NTA and 4,500 mw PAA.

The detergent included the following:

| | |
|---|---|
| Soft Water | 29.7% |
| Polyacrylic Acid (4500 MW) | 5.8% |
| Optical Brightener | 0.1% |
| Sodium Hydroxide (50%) | 4.1% |
| Emulsion Stabilizer | 20.0% |
| Nonylphenol Ethoxylate (6 mole EO) | 23.0% |
| Nonylphenol Ethoxylate (9 mole EO) | 4.0% |
| Trisodium Nitrilotriacetate | 12.0% |
| Linear Alkylbenzene Sulfonate (60%) | 1.3% |

wherein the emulsion stabilizer is a stabilizer formed in accordance with the disclosure in U.S. Pat. No. 4,826,618.

The NaOH builder is 25.5% NaOH, NTA and PAA. The $Na_2Al_2O_4$ builder is a 38% solids solution of $Na_2Al_2O_4$. The amounts added are per hundred weight of wash items.

EXAMPLE 1

PANTS - Control Wash

| OPERATION | TIME (MIN) | TEMP (°F.) | WATER LEVEL (GAL) | SUPPLIES | SUPPLY AMOUNTS PER 100# SOILED LAUNDRY |
|---|---|---|---|---|---|
| Break | 15 | 145 | 9 | Detergent<br>NaOH builder | 32 fl. oz.<br>12 fl. oz. |

-continued

PANTS - Control Wash

| OPERATION | TIME (MIN) | TEMP (°F.) | WATER LEVEL (GAL) | SUPPLIES | SUPPLY AMOUNTS PER 100# SOILED LAUNDRY |
|---|---|---|---|---|---|
| Carry-over | 5 | 145 | 9 | | |
| Rinse | 2 | Hot | 18 | | |
| Rinse | 2 | Hot/Cold | 18 | | |
| Rinse | 2 | Cold | 18 | | |
| Sour | 5 | Cold | 9 | Sour | 2 fl. oz. |

EXAMPLE 2

PANTS - Test Wash

| OPERATION | TIME (MIN) | TEMP (°F.) | WATER LEVEL (GAL) | SUPPLIES | SUPPLY AMOUNTS PER 100# SOILED LAUNDRY |
|---|---|---|---|---|---|
| Break | 15 | 145 | 9 | Detergent<br>$Na_2Al_2O_4$ builder | 32 fl. oz.<br>12 fl. oz. |
| Carry-over | 5 | 145 | 9 | | |
| Rinse | 2 | Hot | 18 | | |
| Rinse | 2 | Hot/Cold | 18 | | |
| Rinse | 2 | Cold | 18 | | |
| Sour | 5 | Cold | 9 | Sour | 2 fl. oz. |

EXAMPLE 3

SHOP TOWELS - Control Wash

| OPERATION | TIME (MIN) | TEMP (°F.) | WATER LEVEL (GAL) | SUPPLIES | SUPPLY AMOUNTS PER 100# SOILED LAUNDRY |
|---|---|---|---|---|---|
| Break | 20 | 170 | 9 | Detergent<br>NaOH builder | 16 fl. oz.<br>64 fl. oz. |
| Carry-over | 5 | 170 | 9 | | |
| Rinse | 2 | Hot | 18 | | |
| Rinse | 2 | Hot | 18 | | |
| Rinse | 2 | Hot/Cold | 18 | | |
| Rinse | 5 | Cold | 18 | | |

EXAMPLE 4

SHOP TOWELS - Test Wash

| OPERATION | TIME (MIN) | TEMP (°F.) | WATER LEVEL (GAL) | SUPPLIES | SUPPLY AMOUNTS PER 100# SOILED LAUNDRY |
|---|---|---|---|---|---|
| Break | 20 | 170 | 9 | Detergent<br>$Na_2Al_2O_4$ builder | 16 fl. oz.<br>64 fl. oz. |

-continued

| SHOP TOWELS - Test Wash | | | | | |
|---|---|---|---|---|---|
| OPERATION | TIME (MIN) | TEMP (°F.) | WATER LEVEL (GAL) | SUPPLIES | SUPPLY AMOUNTS PER 100# SOILED LAUNDRY |
| Carry-over | 5 | 170 | 9 | | |
| Rinse | 2 | Hot | 18 | | |
| Rinse | 2 | Hot | 18 | | |
| Rinse | 2 | Hot/ Cold | 18 | | |
| Sour | 5 | Cold | 18 | | |

The waste water treatment dosages are listed below. These are identified by treatment and load type. The treatment is identified by the step in the wash process from which the waters were taken, break or composite. Break represents the operation of the wash cycle in which the detergents are added, and generally represents the step with the greatest concentration of soil. Composite represents a sampling of water from each step in the wash process in a ratio which is equivalent to the amount of water present in each step. The water samples after treatment were visually evaluated to determine relative success of each treatment. The waters were judged on floc formation (oil break or split) and water clarity (turbidity) and color. A grade was given based on the following scale: very poor, poor, fair, good, very good, excellent. Basically a sample got a very poor rating if the treated water looked no different than the untreated water. A sample received an excellent rating if the treated water was clear and colorless (looked like tap water). Other ratings were given based on varying degrees of results between these extremes. The results are listed below.

Detergent and NaOH builder Shop Towels Break no pH adjust - pH 11.3
polydimethyldiallyl ammonium chloride (DDAC) @ 1000 ppm: good oil break, very poor clarity
EpiAmine @ 1000 ppm: good oil break, very poor clarity
80%/20% (DDAC/EpiAmine) @ 1000 ppm: fair oil break, very poor clarity Detergent and NaOH builder Shop Towels Composite pH 9.3
DDAC @ 600 ppm & polyacrylamide @ 10 ppm: good oil break, poor clarity
80%/20% (DDAC/EpiAmine) @ 600 ppm & polyacrylamide @ 10 ppm: exec. oil break
pH 8.7
DDAC @ 600 ppm & polyacrylamide @ 10 ppm: good oil break, poor clarity
80%/20% (DDAC/EpiAmine) @ 600 ppm & polyacrylamide @ 10 ppm: exc. oil break Detergent and NaOH builder Shop Towels Composite DDAC @ 500 ppm & Tanin @ 100 ppm & polyacrylamide @ 15 ppm: exec. clarity and very good floc
EpiAmine @ 500 ppm & Tanin @ 100 ppm & polyacrylamide @ 10 ppm: exec. clarity and poor floc
80%/20% (DDAC/EpiAmine) @ 700 ppm & polyacrylamide @ 15 ppm: very good clarity, poor floc Detergent and $Na_2Al_2O_4$ builder Shop Towels Composite pH adjustment $H_2SO_4$ (1N) alone cause excellent floc.
pH 7.1
Polyacrylamide @ 10 ppm: exc. clarity, good floc
pH 7.5
DDAC @ 50 ppm & polyacrylamide @ 10 ppm: excellent clarity and floc -continued pH 8.0
DDAC @ 25 ppm & polyacrylamide @ 10 ppm: excellent clarity and floc
pH 8.5
Polyacrylamide @ 10 ppm: good clarity and floc
additional DDAC @ 50 ppm: same
pH 7.1
DDAC @ 25 ppm & polyacrylamide @ 20 ppm: excellent clarity and floc water Detergent and $Na_2Al_2O_4$ builder Shop Towels Composite pH 8.4
DDAC @ 25 ppm & polyacrylamide flocculent @ 10 ppm: excellent floc and clarity Detergent and $Na_2Al_2O_4$ builder Pants Composite pH 9.4
DDAC @ 400 ppm: fair clarity and floc until pH reduced to <7.5 then very good
EpiAmine @ 400 ppm: fair clarity and floc until pH reduced to <7.5 then very good
80%/20% (DDAC/EpiAmine) @ 400 ppm: fair clarity and floc until pH reduced to <7.5 then very good
50%/50% (DDAC/EpiAmine) @ 400 ppm: fair clarity and floc until pH reduced to <7.5 then very good Detergent and $Na_2Al_2O_4$ builder Pants Composite pH 6.1
DDAC @ 100 ppm & polyacrylamide @ 10 ppm: excellent clarity and floc
pH 7.2
DDAC @ 100 ppm & polyacrylamide @ 10 ppm: excellent clarity and floc
pH 7.4
DDAC @ 100 ppm & polyacrylamide @ 10 ppm: excellent clarity and floc
pH 7.6
DDAC @ 100 ppm & polyacrylamide @ 10 ppm: excellent clarity and floc Detergent and $Na_2Al_2O_4$ builder Shop towels/Pants Composite of composites pH 8.0
4:1 shop:pants
DDAC @ 50 ppm & polyacrylamide @ 20 ppm: very good clarity
1:1 shop:pants
DDAC @ 50 ppm & polyacrylamide @ 20 ppm: excellent floc and clarity
9:1 shop:pants
DDAC @ 50 ppm & polyacrylamide @ 20 ppm: very good clarity These examples demonstrate that the addition of sodium aluminate significantly improves the waste water treatment of waste laundry water. In these examples the sodium aluminate functions as the sole source of alkalinity and a destabilizing agent causing the oily soils to separate from the solution. Further, as shown in the examples the need for the addition of any coagulating polymer decreases as the concentration of the sodium aluminate increases.

In order to determine the effect of pH on oil and grease results as it relates to concentration of $Al_2O_3$ and polymer, a test was initiated. The test involved bringing in selected loads of soiled garments from a local industrial laundry. These garments were processed using the wash formula in Examples 2. The detergent dosage and type used was also the same as the example. Water from each wash step was collected in a ratio equivalent to the quantity of water utilized in the entire formula (1 part on low level operations, 2 parts on high level). The alkaline builder dosage was varied so that the composite water sample collected had a level of $Al_2O_3$ equivalent to 50, 100, 150, and 200 ppm. A 0 ppm $Al_2O_3$ sample was also collected which utilized the NaOH builder from Example 1. The pH of each of these water samples was adjusted to a pH of 7.0, 7.5, 8.0, 8.5, and 9.0. Each of the samples with the differing pH was then treated with five differing levels of epiamine polymer 0, 50, 100, 150, 200 ppm. The resulting water was then collected and tested for oil and grease using method 5520B from the 17th Edition of the *American Public Health Association Standard Methods Publication.*

Figure 2:
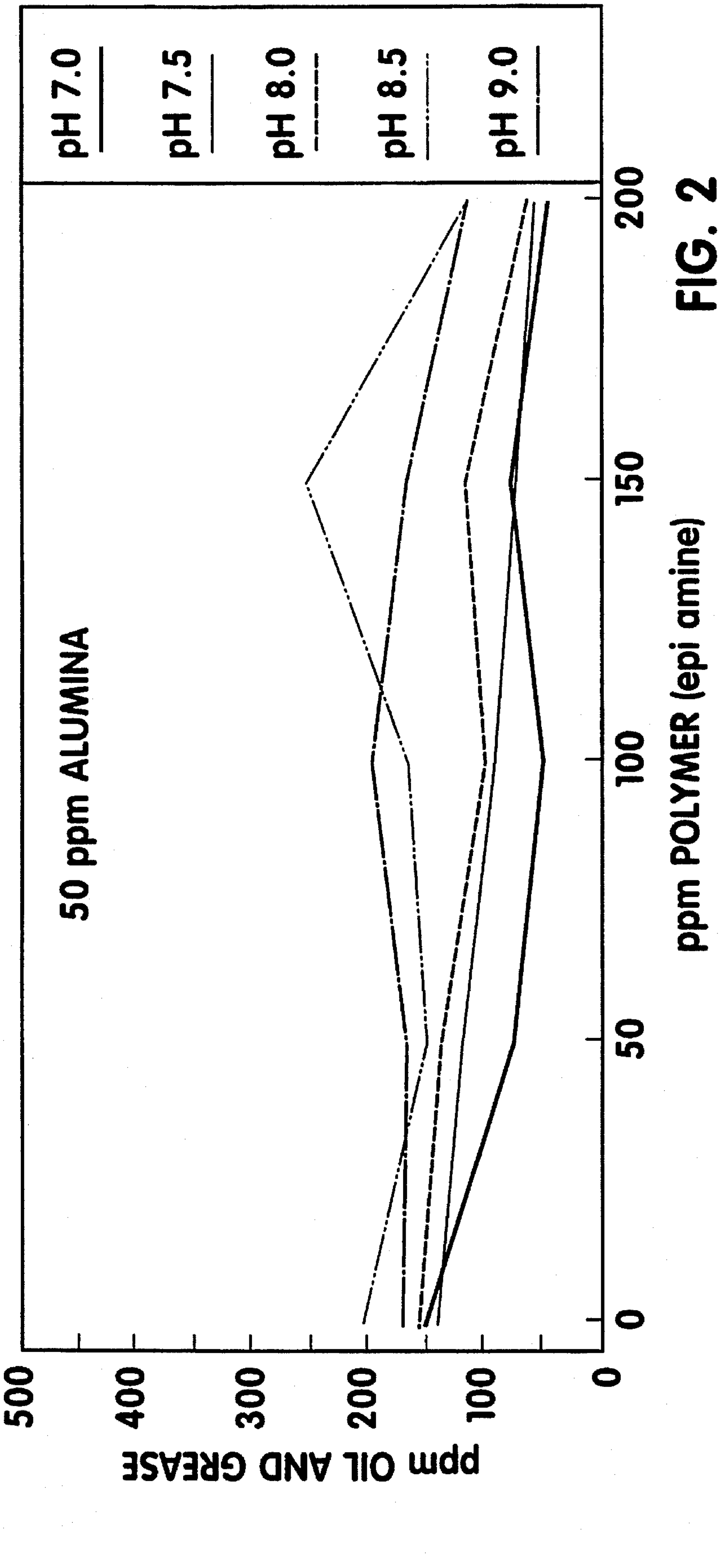
Figure 3:
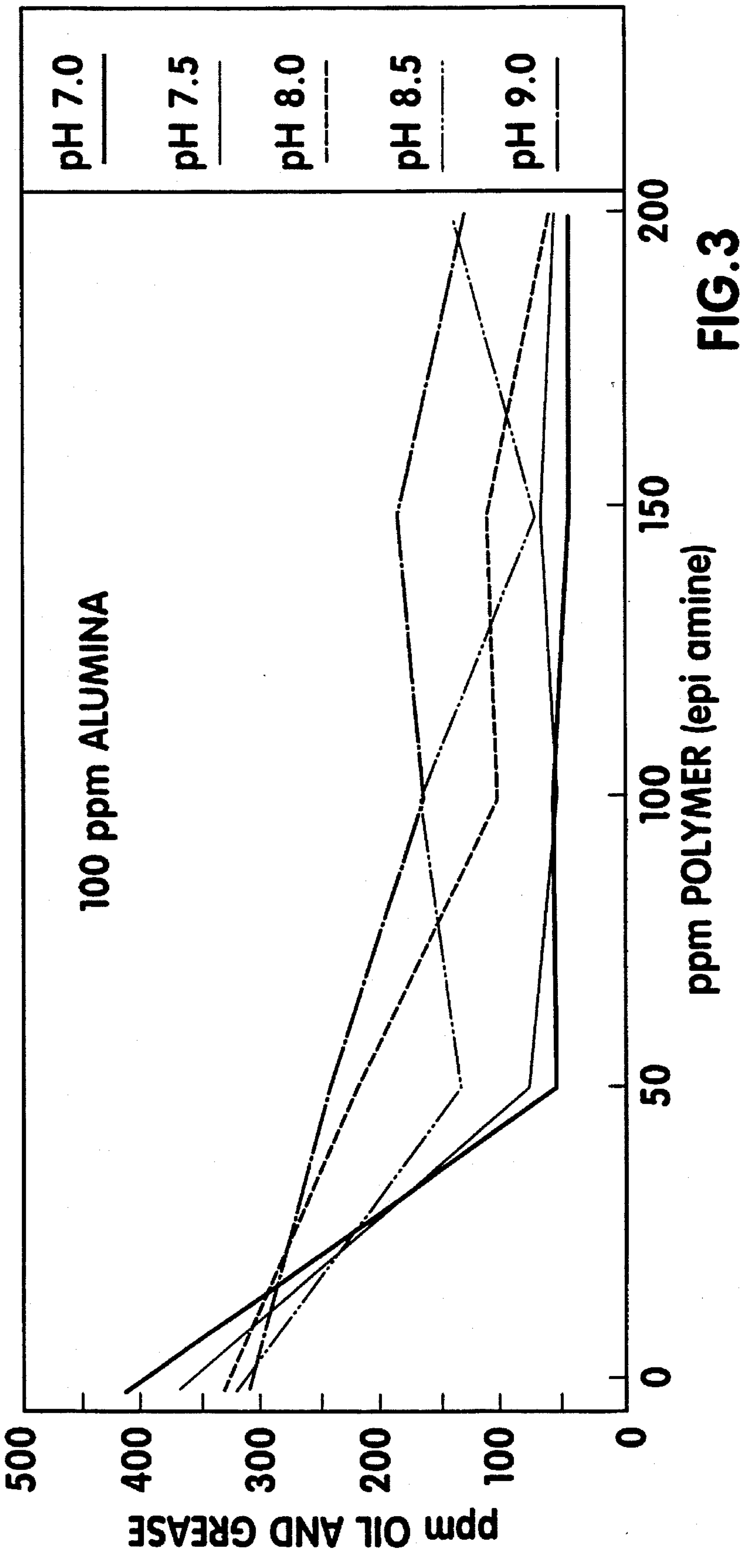
Figure 4:
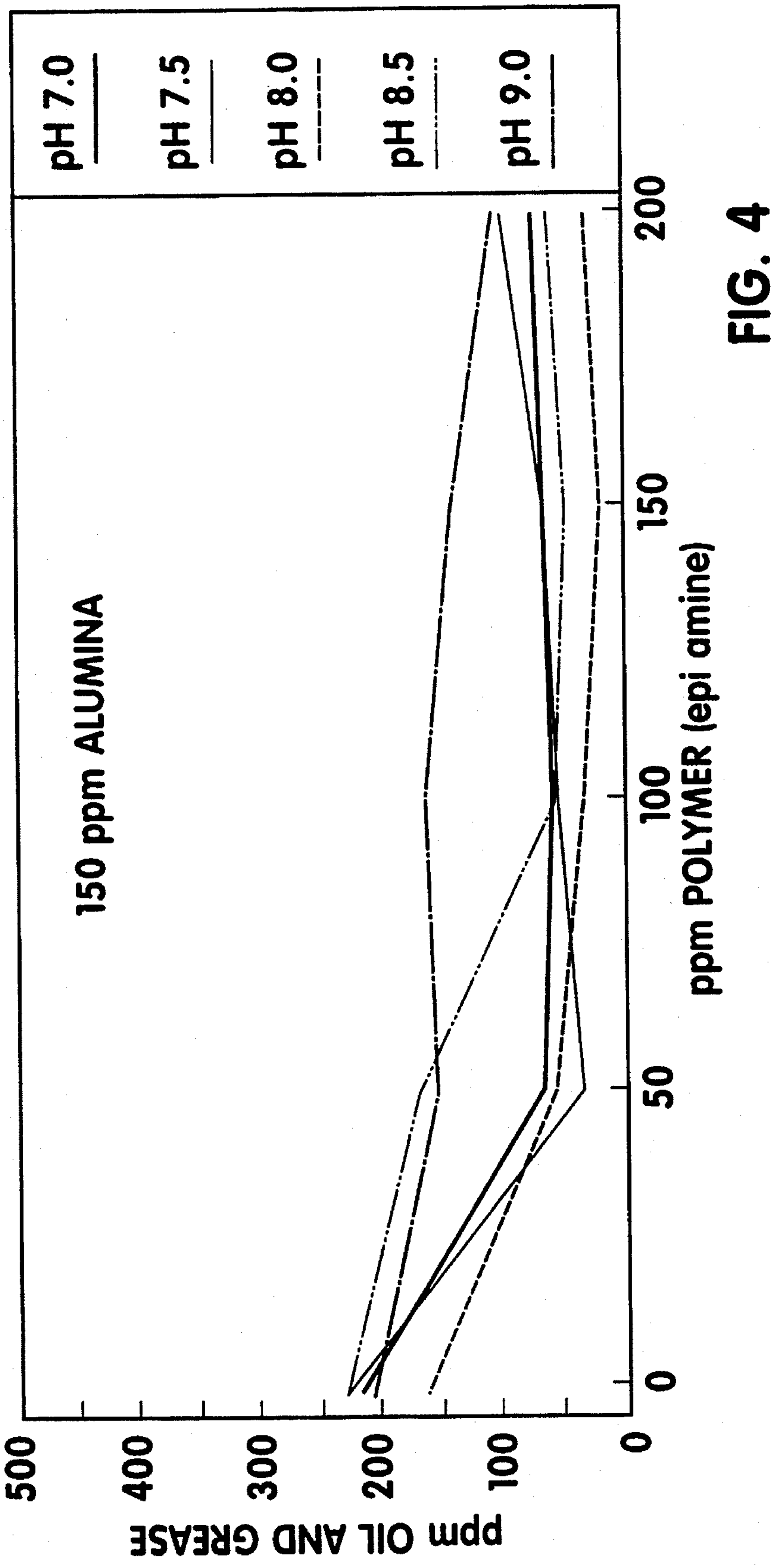
Figure 5:
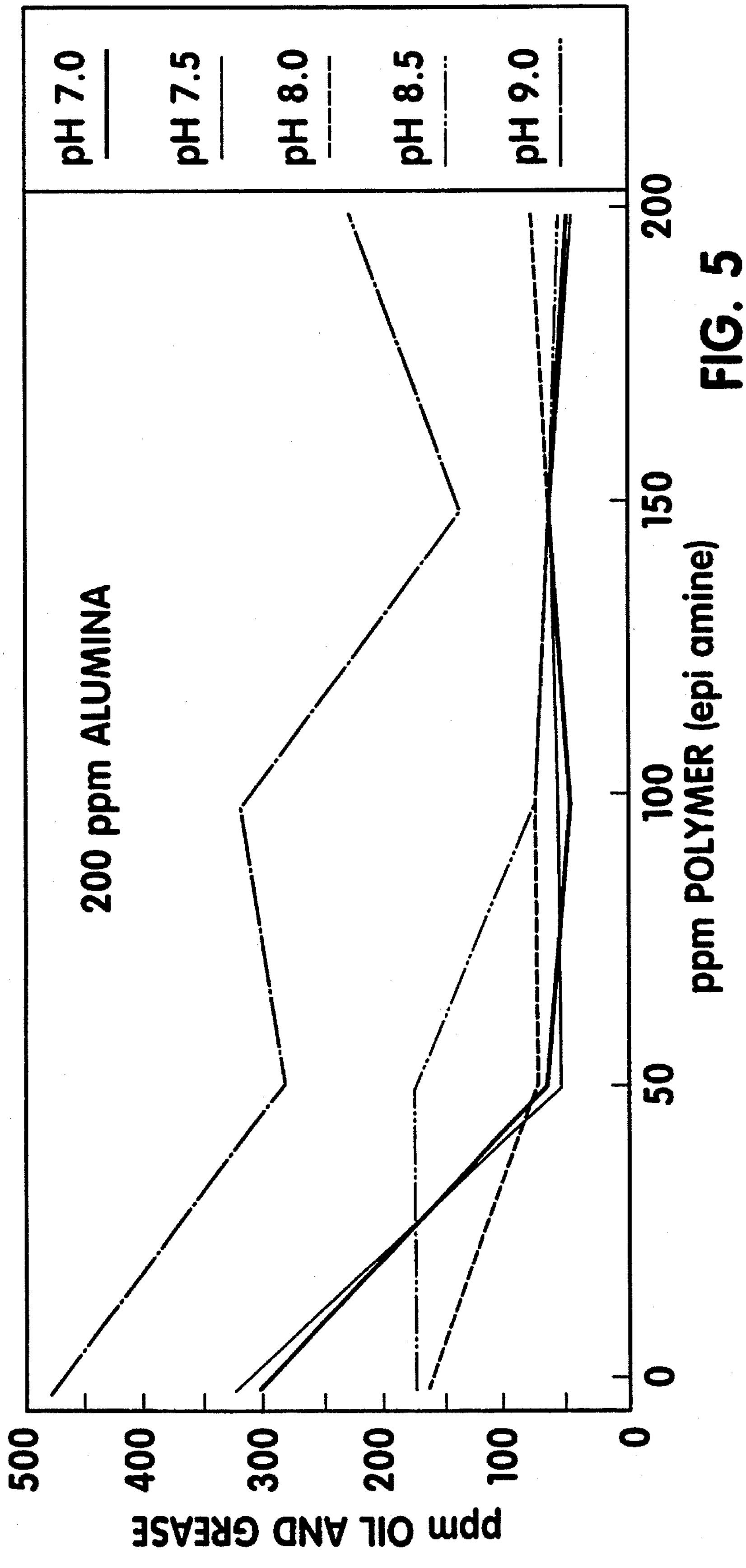

Untreated water for each of the five alumina dosage tests was also collected and tested using the same method. Since the results for the original untreated waters varied, all the results were normalized so that all original untreated water results equaled 250 ppm oil/grease. Results for each alumina treatment are shown in the FIGS. 1–5. Results indicate that the greater the level of $Al_2O_3$ in the solution being treated, the less the demand of polymer required, especially as the pH is reduced from 9 to 7. One hundred (100) ppm was the target acceptable oil and grease level since that is a typical effluent restriction as of today.

It is particularly important to note that when tested the sodium aluminate as a substitute for the sodium hydroxide did not alter cleaning efficacy. Thus the present invention provides both effective cleaning and effective oil and grease separation from the waste water. Further, the sodium aluminate is not significantly more expensive than the sodium hydroxide, thus there is no significant increase in cost.

This of course has been a description of the present invention along with the preferred method of practicing the invention. However, the invention itself should only be defined by the appended claims wherein we claim:

1. A method of oily laundering items in an aqueous based washing solution and treating said washing solution comprising;

laundering said oily items in said washing solution wherein said washing solution comprises a surfactant system and an effective amount of an alkaline metal aluminate at an alkaline pH of at least 9;

separating said washing solution from said items;

reducing the pH of said washing solution to cause said alkali metal aluminate to separate from said washing solution.

2. The method claimed in claim 1 wherein said effective amount of said alkali metal aluminate comprises at least about 25 ppm.

3. The method claimed in claim 2 wherein said washing solution includes an antiredeposition aid selected from a group consisting of carboxy methyl cellulose, water soluble polymers formed from polyacrylic acid, polymethylacrylic acid and polymaleic acid.

4. The method claimed in claim 2 wherein said alkali metal aluminate is selected from the group consisting of sodium aluminate and potassium aluminate.

5. The method claimed in claim 4 wherein said alkali metal aluminate is sodium aluminate having a mole ratio of $Na_2O/AlO_3$ of 1:1 to 10:1.

6. The method claimed in claim 4 wherein said wash solution has a pH of from about 9.5 to about 12.5.

7. The method claimed in claim 6 further comprising adding a flocculent to said wash solution after said pH has been lowered below about 9.

8. The method claimed in claim 5 further comprising adding a separation polymer.

9. The method claimed in claim 8 wherein said separation polymer is selected from the group consisting of tanin, polydiallyldimethyl ammonium chloride and epichlorohydrinamine.

10. The method claimed in claim 4 wherein said washing solution includes 25 to about 4,000 ppm alkali metal aluminate as $Al_2O_3$.

11. The method claimed in claim 10 wherein said alkali metal aluminate is added to said washing solution in an amount effective to establish a pH greater than about 9.5.

12. The method claimed in claim 11 wherein said washing solution contains 250 to 1,100 ppm alkali metal aluminate.

13. The method claimed in claim 2 wherein said washing solution includes a nonphosphate sequestrant.

* * * * *